INVENTOR.
MAXIMILIAAN H. BODMER

Nov. 1, 1966   M. H. BODMER   3,283,329
RADAR AERIALS FOR HELICAL SCANNING
Filed May 3, 1963   6 Sheets-Sheet 3

INVENTOR.
MAXIMILIAAN H. BODMER
BY
AGENT

Nov. 1, 1966 M. H. BODMER 3,283,329
RADAR AERIALS FOR HELICAL SCANNING
Filed May 3, 1963 6 Sheets-Sheet 6

INVENTOR.
MAXIMILIAAN H. BODMER
BY
AGENT

United States Patent Office 3,283,329
Patented Nov. 1, 1966

3,283,329
RADAR AERIALS FOR HELICAL SCANNING
Maximiliaan H. Bodmer, Hengelo, Overijssel, Netherlands, assignor to N.V. Hollandse Signaalapparaten, Hengelo, Overijssel, Netherlands
Filed May 3, 1963, Ser. No. 277,917
11 Claims. (Cl. 343—759)

The invention relates to a radar aerial system arranged to rotate around a first, substantially vertical axis and comprising a beam concentrating device, such as a reflector and a waveguide radiator capable of irradiating said beam concentrating device and arranged to swing between two extreme positions around a second, substantially horizontal, mechanical axis which accompanies the rotation around the substantially vertical axis. The driving arrangement for the aerial system causes the complete aerial system to perform at least a number of rotations around the substantially vertical axis during the said swinging motion of the waveguide radiator between the two extreme positions in at least one of the two possible directions of motion.

This type of aerial is used to search the sky for targets by means of helical scanning. If the aerial is mounted on a fixed support or on a stabilized platform both axes are mechanical axes. If the aerial is mounted on a moving support, such as a ship's deck, and is built with three axis-stabilization, only the horizontal axis is actually present while the other axis is not materially present. Rotations around this axis are controlled by the stabilizing system and are caused by effecting rotations around the other two axes, which are materially present. The stabilizing system also substantially maintains the horizontal axis in its horizontal position by controlling rotations around the said other two axes.

As compared with the radar systems with plan position indicator, which search the sky by means of a vertically arranged fan shaped beam with large vertical dimensions which rotates around a vertical axis, the system with helical scan has the important advantage that a substantially less powerful transmitter suffices for a given range owing to the fact that the cross section of the beam is so much smaller. It shows a considerable disadvantage, however, in that its aerial must perform a number of rotations around the vertical axis in order to scan the space around its site completely. It is the object of the present invention to reduce the number of aerial rotations required by a helically scanning radar apparatus for scanning the environs of its site. In this way it overcomes to a large extent the disadvantages of the helical scanner. The invention exploits the fact that the largest range is only required when the elevation of the beam is small. As soon as the elevation increases, the required range is restricted by the fact that the height of the targets cannot be expected to exceed a value which is substantially smaller than the maximum range of a helically scanning radar apparatus. According to the invention the radar aerial system is built in such a way that the dimension of the opening of the waveguide radiator (i.e. flare angle) in the direction transverse to the second, or substantially horizontal axis is variable, and that this flare angle during at least a part of the stroke of the radiator around the said second or substantially horizontal axis increases when the angle between the axis of the beam and the upper part of the produced first, or substantially vertical axis of rotation of the aerial system decreases. The driving arrangement of the aerial in at least one of the two possible directions of movement of the radiator around the said second axis increases the rotational speed of the radiator as compared with the speed around the first or substantially vertical axis as the said flare angle increases.

The increase in flare angle of the waveguide nozzle radiator reduces the aerial gain and consequently the range of the apparatus. By suitably varying the flare angle of the waveguide radiator in the elevation direction the range can be adapted to the elevation in such a way that within the area to be searched the range of the apparatus is continuously adapted to the range required in connection with the restriction of the height of the targets. Consequently the aerial according to the invention can search the complete environs of its site within a smaller number of rotations around its vertical axis than a normal helical scanning aerial.

Preferably the waveguide radiator is fixedly mounted to the beam concentrating device and arranged to swing together with the said device as a single unit around the second, substantially horizontal, axis in order to direct the radar beam around the said axis. In an effective embodiment of a waveguide radiator with variable flare angle to be used in an aerial according to the invention, the radiator is a horn radiator and comprises two oppositely situated fixedly positioned walls and two movable wall elements situated between the fixedly positioned walls and driven together so as to swing about supports fixedly mounted with respect to the fixedly poistioned walls and situated near the feeding point of the horn radiator.

In order to permit the swinging motion of the movable wall elements these elements are supported by small axes or by springs, such as plate springs. The horn radiator can also be provided with three fixedly mounted walls and only one movable wall element of the type described above.

In the vicinity of the slots between the fixed and the movable walls of the horn radiator measures must be taken in order to prevent energy losses. For this purpose in accordance with the invention the movable wall elements can be provided near the fixed walls with resilient metal tongue shaped extensions which slide over the fixed walls when the movable elements are swinging. In another embodiment the movable wall elements are provided with slot shaped chokes of the well known type at the edges situated near the fixed walls. In particular "serrated chokes" have proved to be very effective in preventing losses in the horn radiator described.

In certain embodiments the beam of an aerial for helical scanning moves slowly in only one elevation direction but rapidly returns to its starting position in elevation after having searched the complete elevation range to be searched. This method of operation reduces the interval during which no information is received from a certain target. In such an embodiment the rotational speed around the elevation axis is only adapted to the radiator dimension during the slow stroke, during which the significant information is received, whilst the return stroke is performed as rapidly as possible without adaption to the radiator dimensions, for the information received during the rapid return stroke is not used, and it is, therefore, unimportant whether a part of the sky is left unscanned during this stroke.

The invention will now be elucidated by describing certain embodiments with reference to the annexed drawings.

The first figure in a reference number is always equal to the number of the figure in which the part designated by the reference number is present, so that it is superfluous to refer to the numbers of the figures in the specification following hereunder. Moreover, the last two figures in reference numbers designating corresponding elements in different figures are always the same.

Figure 1:
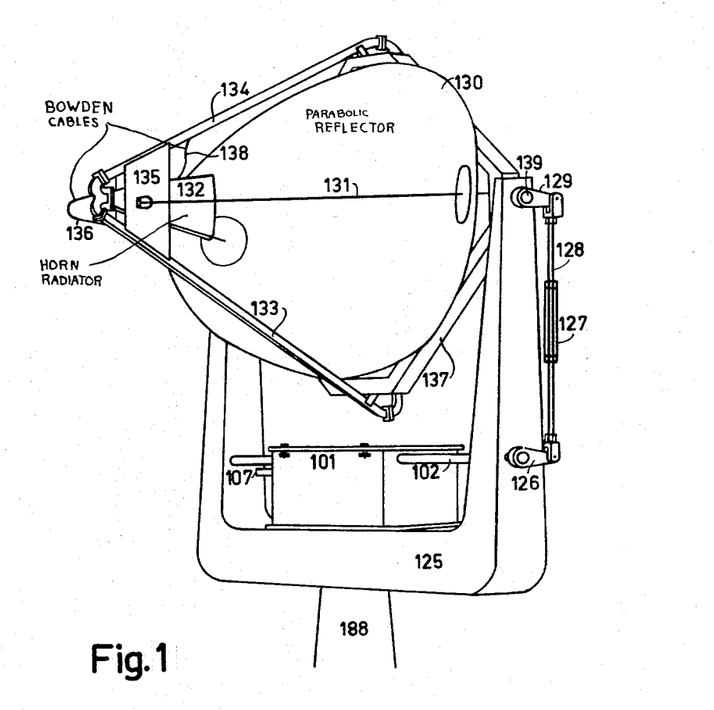
FIGURE 1 shows a complete view of an aerial according to the invention.

The first embodiment of the invention to be described here is an aerial comprising a reflector for concentrating the beam fixedly combined with a horn radiator to a unit that can rotate around a horizontal and a vertical axis. In FIGURE 1 the parabolic aerial reflector is designated by 130. It is carried by a frame 137 provided with a horizontal or elevation axis and it is rotatably supported on this axis in a fork shaped yoke 125. This yoke can rotate on a vertical axis which is rotatably supported in a fixedly mounted column 188. The horn radiator 132, which irradiates the reflector 130 has a variable opening. This radiator is supported on the frame 137 by means of two rod-shaped supports 133 and 134, one of which also constitutes the feeding wave guide for the radiator. The radiator is maintained in its correct position with respect to the reflector by means of two wire stays or bracing wires, such as 131, which pass through openings in the reflector to the frame 137, to which they are connected by means of spanners or similar means to keep them taut. Two plates, such as 135 support the radiator 132 on the supporting rods 133 and 134. The mechanism effecting the rotation of the unit consisting of the reflector and the radiator around the elevation axis 139 is contained in a welded steel box 101 mounted on the fork-shaped yoke 125. This mechanism drives a shaft 102. At one end this shaft carries a crank 126. A rod 128 connects this crank to a second crank 129 fixedly mounted to the elevation axis 139 of the reflector. The rod is hinged to the two cranks and a length adjusting arrangement 127 of well known type provided with left hand and right hand thread permits an adjustment of the smallest elevation of the beam when the shaft 102 has been driven into the corresponding position by the driving mechanism in the box. The other end of the shaft 102 drives the left hand end of the elevation axis by means of a similar driving rod system, but this second driving system is not visible in the figure because it is hidden from sight by parts of the fork shaped yoke 125. This two-sided driving system for the elevation axis is used in order to prevent deformation by torsion of the frame 137 supporting the aerial reflector.

The box 101, moreover, contains a rotatable waveguide joint through which the aerial is fed. A waveguide connected to this joint is designated by 107. This waveguide is carried around one of the arms of the yoke and then behind this yoke to a second rotatable waveguide joint which is coaxial with the elevation axis 139. This joint is not visible in the figure because it is situated behind the reflector. By way of this joint the radiator 132 is connected to and fed by the waveguide 107.

In the embodiment described the mechanism for varying the opening of the horn radiator is driven by means of Bowden cables. These cables are designated by the references 136 and 138. They are supported by the supporting rods 134 and 133 and carried by the frame 137 behind the reflector to the arrangement for driving these cables.

Figure 2:
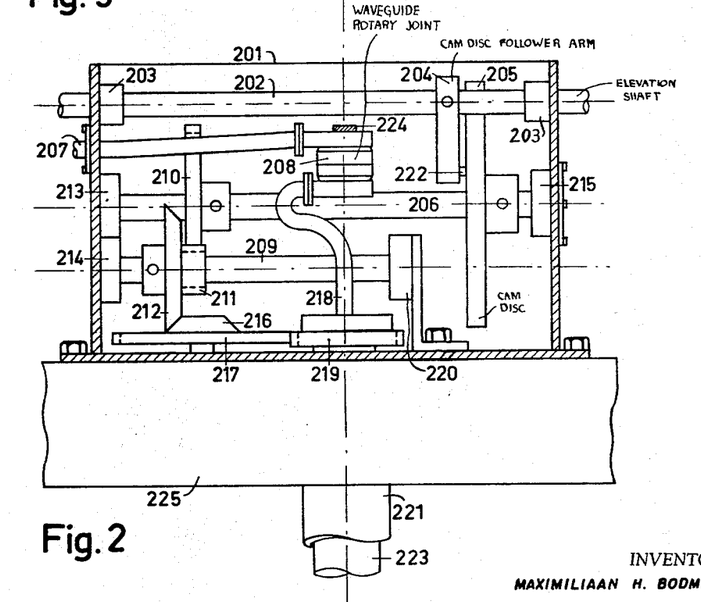
FIGURES 2 and 3 show the mechanism for driving the aerial around the elevation axis.
Figure 3:
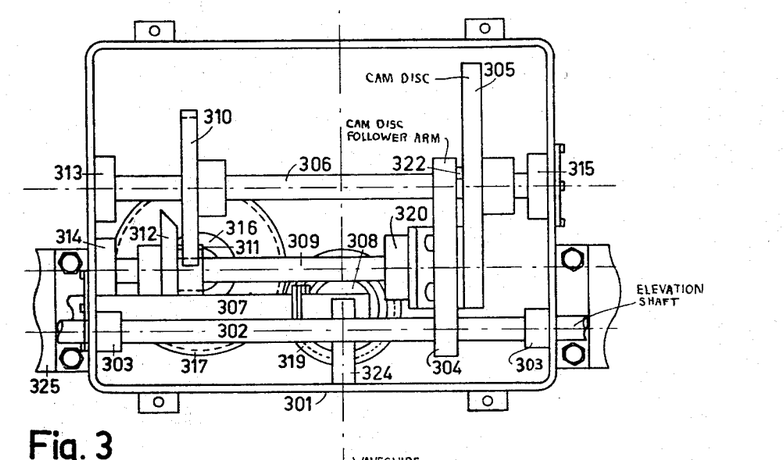
Figure 4:
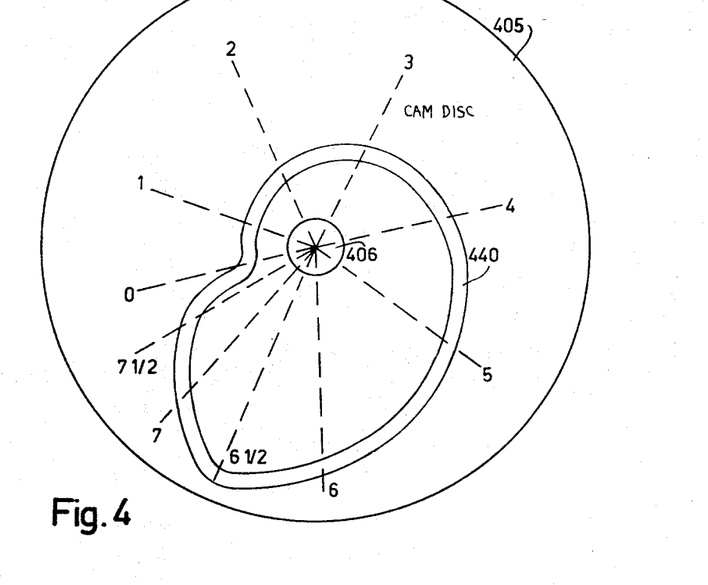
FIGURE 4 shows the driving disc used in the mechanism shown in FIGURES 2 and 3.

The mechanism for driving the reflector around its elevation axis will now be described with reference to the FIGURES 2, 3 and 4. This mechanism is mounted in the welded steel box 201, 301 designated by 101 in FIGURE 1, and this box is fixed by means of bolts to the yoke 225 supporting the elevation axis for the aerial reflector. This yoke is supported by a hollow shaft 221, which can rotate in bearings mounted in the fixed vertical column 188 and can be driven by a motor in order to rotate the aerial around a vertical axis. A second hollow shaft 223 passes through the first-mentioned hollow shaft and is fixedly connected to the lower part of the column so that it does not partake in the rotation of the yoke. The waveguide feeding the aerial passes through this second hollow shaft. The upper extremity of the said second hollow shaft 223 carries a gear-wheel 219 and is supported in the yoke 225, 325, just below this gear-wheel by means of a ball-bearing not shown in the figures. When the yoke 225, 325 rotates, the gear-wheel 219, 319, which is fixedly connected to the stationary shaft 223, also remains stationary and consequently drives the gear-wheel 217, 317 as well as the bevel gear 216, 316 connected thereto. These gears are mounted on a vertical shaft which can rotate in bearings situated in a cylindrical extension not shown in the figures but situated below the bottom of the box 201, 301. By means of a second bevel gear 212, 312 the bevel gear 216, 316 drives the gear-wheel 211, 311 fixed to a shaft 209, 309 which can rotate in bearings mounted in the supports 214, 314 and 220, 320. The gear-wheel 211, 311 eventually drives, by means of a gear-wheel 210, 310, a shaft 206, 306, on which a cam disc 205, 305 is fixedly mounted. This shaft 206, 306 rotates for this purpose in ball bearings carried in supports 213, 313, and 215, 315. The cam disc is provided with a groove which constitutes a closed track surrounding the shaft. An example of the shape of such a groove is shown in FIGURE 4. A small cylindrical roller runs in this groove, and this roller is rotatable around a short shaft or pin 222, 322 carried by cam disc follower arm 204, 304, which is fixedly mounted to shaft 202, 302. This shaft can rotate in bearings such as 203 and 303, supported by the walls of the steel box. Consequently the shaft 202, 302 will oscillate when the yoke 225, 325 rotates around the axis of the shaft 221. This oscillating shaft is the shaft designated by 102 in FIGURE 1 and consequently drives the aerial reflector around its elevation axis. The waveguide 218 is connected by means of two curved parts to the rotatable waveguide joint 208, 308, which is coaxial with the axis 221. The upper part is supported on the steel box 201, 301 by means of an arm 224, 324. The said upper part is connected by means of the waveguide 207, 307, to the second waveguide joint, which is coaxial with the elevation axis and in this way joins the waveguide 218 connected to the receiver-transmitter apparatus to the radiator. This feeding method is well-known in the art and needs no further elucidation.

Figures 7, 8:
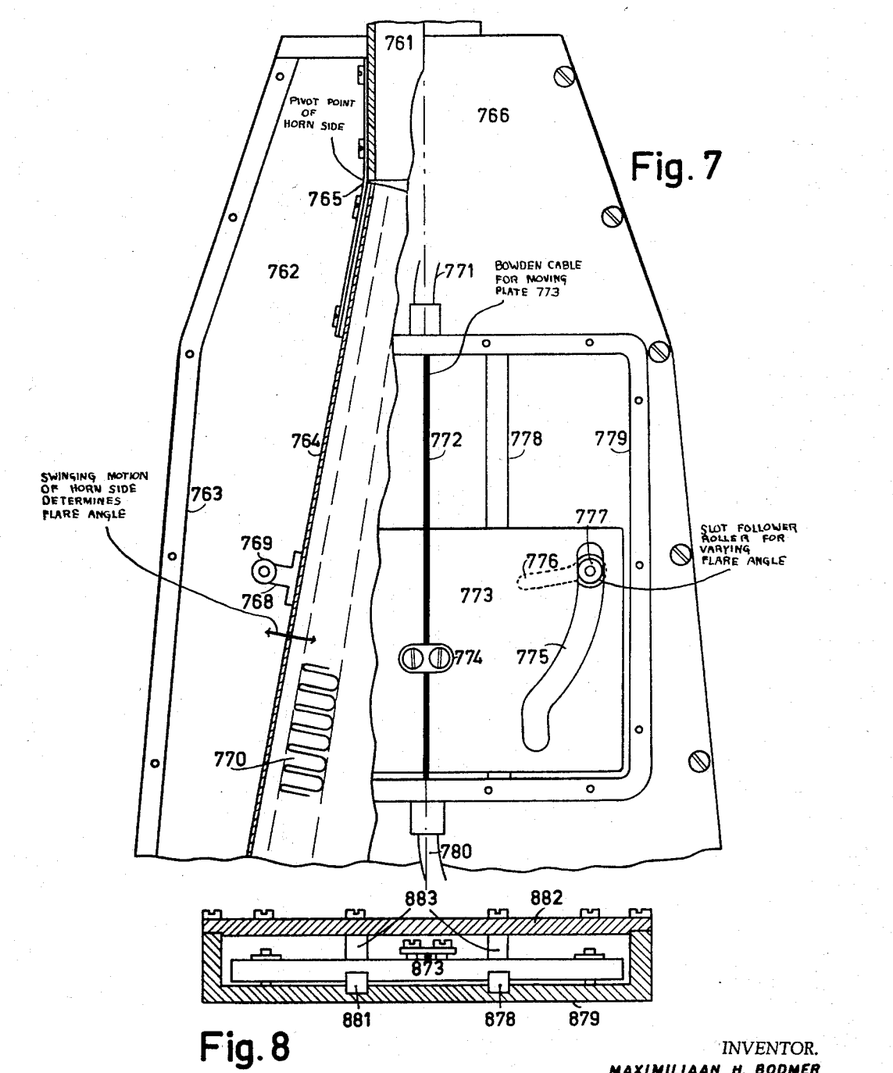
FIGURE 7 shows a horn radiator with variable opening.
FIGURE 8 shows the driving mechanism for the movable wall elements of the radiator shown in FIGURE 7.

The FIGURES 7 and 8 show the construction of the horn radiator. This radiator is contained in a housing consisting of two metal plates 766 and 762, which are fixedly mounted by means of screws to two rods such as 763. In FIGURE 7 the housing is shown partly closed in front view and partly with the upper metal plate and part of the housing 779 removed. The radiator is fed by means of a waveguide 761 the largest dimension of which is parallel to the plane of the drawing. The cross sections of the housing perpendicular to the axis of this waveguide are all rectangular, but the plates 766 and 762 are not parallel. Near the waveguide the distance between the plates is equal to the smallest dimension of the waveguide, while at the end away from the waveguide the distance between the plates is larger. In this way the width of the radiator required for irradiating the largest dimension of the reflector is obtained.

Figure 9:
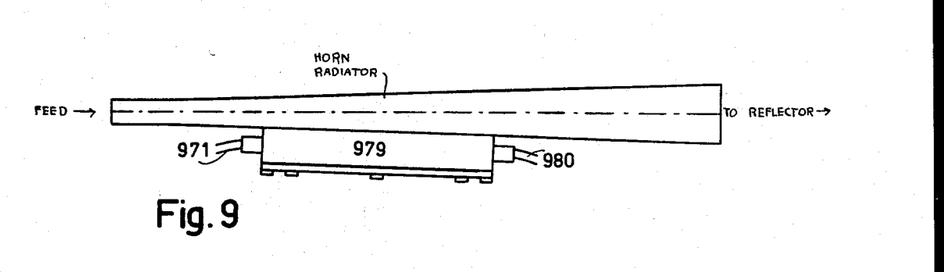
FIGURE 9 shows a top view of a radiator according to FIGURE 7.

FIGURE 9 shows the horn radiator seen in a direction perpendicular to its axis as well as to its smallest dimension. This figure shows how the distance between the plates increases from the feeding point to the radiator opening. A horn side consisting of a metal arm 764 with a U-shaped cross section is connected by means of a spring 765 to one of the two smallest walls of the waveguide 761. The central part of the U is perpendicular to the plane of the drawing. The dimensions perpendicular to the plane of the drawing of this part are nearly equal to the distance of the plates at the corresponding point, so that the arm fits fairly narrowly in the housing. The two legs of the U are more or less parallel to the plates of the housing and are provided with tongue-shaped extensions such as 770. The metal of the arm is resilient and the tongue-shaped extensions are pre-stressed and rest against the plates of the housing with a certain amount of pressure, so that they will remain in electrical contact with the plates of the housing. In this way loss of radiating energy to the space at the left-hand side of the arm is prevented. A support 768 is mounted to the arm 764. This support carries a thin shaft which is perpendicular to the plane of the drawing and passes through a slot in the plate 766. Outside the housing it carries a small slot follower roller 769, by means of which the arm is moved in and outwards. A similar arm is present in the right-hand part of the housing. This arm is connected by means of a spring to the other small wall of the waveguide. The driving mechanism of the two arms is shown in front view on the right-hand half of FIGURE 7 and in cross section in FIGURE 8. This driving mechanism is mounted in a separate flat housing, which is shown in FIGURE 7 with its cover removed. A plate 773, 873, made of a hard aluminum alloy, can slide in this housing on nylon guide rods 778, 878, 881. These guide rods are situated in slots in the housing and are locked between its walls. The plate 773, 873 is provided with slots, by means of which it slides on the guide rods. The plate itself is locked under two other guide rods 883, connected to the cover 882 of the housing by means of screws. The plate is driven by the inner cable of a system of two Bowden cables 771 and 780. This inner cable is connected to the plate by means of a clamping device consisting of a strip 774 and two screws. By means of this inner cable the plate 773, 873 can be shifted along the nylon guide rods. The plate is provided with two slots, one of which, the slot 775, is shown. Each of the two rollers connected to the arms is situated in such a slot. The slot follower roller 777, which is supported by the right-hand arm (not shown in the figure), runs in the slot 775. The shaft carrying this roller can move through a slot 776 in the plate 766 of the housing of the radiator and through a corresponding slot in the bottom of the housing of the driving mechanism of the arms when the arm carrying the roller is caused to swing. If the arm is in its outer position the plate 766 can be removed without removing the roller 777 because in the corresponding position the said slots are provided with a round opening of sufficient diameter. It needs no further elucidation that when the plate 773 is shifted to and fro in the housing by means of the inner cable 772 the distance between the free ends of the arms away from the waveguide varies and thus the flare angle of the horn radiator varies. In the position of the plate 773 shown in the figure the said ends of these arms are at the largest distance from each other. In the other extreme position of the plate 773 the said ends of the arms are at the smallest distance from each other.

Figure 5:
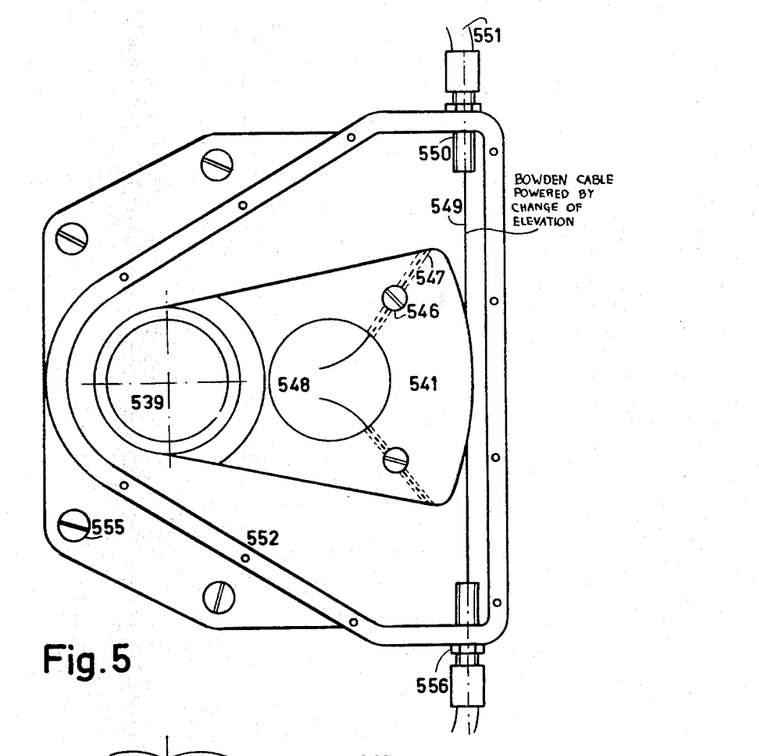
FIGURES 5 and 6 show a Bowden-cable driving arrangement for the radiator-opening changing mechanism.
Figure 6:
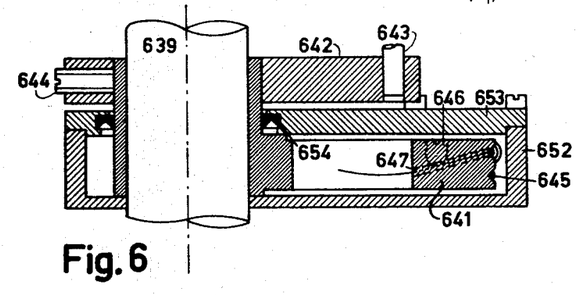

The way in which the Bowden cable is driven will now be described. The driving mechanism for this cable is shown in FIGURES 5 and 6. This mechanism is situated in a housing 552, 652. In FIGURE 5 this housing is shown in its opened condition with the parts 642 and 653 removed. It is fastened by means of screws, such as 555, to the frame 137 carrying the aerial reflector. It embraces the elevation axis, which in the FIGURES 5 and 6 is designated by 539 and 639. A segment 541, 641, is supported by the elevation axis and freely rotatable around this axis which is itself fixedly mounted to the frame 137. In the axial direction the segment is locked between the cover 653 and the bottom of the housing 652. The segment possesses a cylindrical extension, which encloses the elevation axis 639 and which protrudes from the housing, where a driving arm 642 is clamped to this extension by means of a set screw 644. The passage for the extension contains a packing ring 654 so that no moisture can enter the housing through this opening. A pin 643 is fixedly mounted to one of the legs of the yoke 125 and extends into an opening of the driving arm 642, so that this driving arm and the segment 641, 541 remain in a fixed position with respect to the yoke 125. When the aerial performs an elevation motion the housing 552, 652 rotates together with the aerial reflector, so that under these circumstances the segment 541, 641 will rotate to and fro in the housing. In FIGURE 5 the segment is shown in the position corresponding to the half elevated condition of the aerial. By suitable adjustment of the driving arm 642 on the extension of the segment it will always be possible to prevent the segment from running up against the walls of the housing when the aerial effects its elevation movement. The segment is provided with two grooves, such as 645. Each of these grooves contains one of the ends of the inner cable 549, 772 of the Bowden cable system for driving the plate 773 in the radiator mechanism. Each of the ends of the cable is fixed by means of a set screw such as 546, 646 in an opening, such as 547, 647. The inner cable can be tensioned, because the segment 541, 641 is provided with an opening 548 into which the ends of the inner Bowden cable protrude. Moreover, a first cable spanner 550 is mounted in the upper wall of the housing and supports the outer cable 551. This spanner is situated just above the rear groove in the segment and leads the inner cable into this groove. A similar cable spanner 556 is situated in the lower wall of the housing but a little more to the front so that the cable supported by this spanner leads its inner cable into the front groove of the segment. It needs no further elucidation that the inner cable 549 of the Bowden cable system is moved upwards or downwards with respect to the housing. When the segment rotates with respect to the housing as a result of the elevation movements of the aerial reflector. The inner cable then drives the plate 773 of the driving mechanism of the radiator.

For every position in elevation of the aerial the required beam angle can be determined. As long as the beam does not at its maximum range reach the plane defining the maximum working height of the radar apparatus the smallest beam angle must be used. As soon, however, as the beam reaches the said plane within its maximum possible range, a smaller range, and thus a larger beam angle, can be applied. There will be no difficulty in calculating the distance at which the beam intersects the said plane of maximum height for each position in elevation of the aerial. In this way the required range for each position in elevation is also determined and from this required range the corresponding vertical beam angle can be determined and each beam angle corresponds to a certain distance between the arms in the horn radiator. Furthermore, the position of the plate 773, 873, is known for every position in elevation of the aerial so that the shape of the slot 775 can be determined.

Experience has shown that arms provided with resilient tongue-shaped extensions are very effective electrically, but the said extensions as well as the walls on which they slide are subjected to heavy wear. It is also possible to provide the arms near their edges with slots operating as chokes. Normal slot chokes, however, require precision work, and as a rule the so called "serrated choke" is to be preferred in the radiator of the type described. Parts of arms provided with serrated chokes are shown in the FIGURES 10, 11 and 12.

Driving the arms in the radiator by means of a Bowden cable and a slotted plate permits an inexpensive construction but has the disadvantage of many sliding parts which need a certain amount of supervision and periodical lubrication, whilst wear of the sliding parts cannot be avoided.

Other mechanical driving methods can be applied, e.g. systems using rods or rotatable shafts. When such a driving system is used it is not necessary to adapt the driving connection between the said rods or shafts and the arms in the radiator to the required variation in the opening as a function of the elevation. This variation can be effected by driving the said shafts or rods by means of cams of suitable shape or by similar driving means. A very effective but more expensive driving system for the arms in the radiator is the hydraulic driving system of the type used in braking systems of motorcars. In an effective embodiment of such a hydraulic driving system the segment 541 in FIGURE 5 is replaced by a cam which drives the piston in a hydraulic master cylinder. Just as in a hydraulic braking system of a motorcar this piston uncovers in its position of rest, an opening through which the inner space of the cylinder is in free connection with a container for the hydraulic fluid. This position corresponds to the position of rest of the arms in the radiator which may be either the outer position or the inner position. Springs can be used to drive the arms into this position of rest. As soon as the reflector performs an elevation movement out of this position of rest the piston in the hydraulic cylinder is displaced. Then the connection with the container for hydraulic fluid is broken because the piston covers the opening constituting this connection, so that a piston in a hydraulic cylinder in the vicinity of the radiator is driven by the hydraulic fluid displaced by the piston in the master cylinder. In a certain embodiment this hydraulic cylinder drives the plate 773 described above and in this case the variation in the opening of the radiator as a function of the elevation can be determined by the shape of the slots as well as by the shape of the cam driving the piston in the hydraulic master cylinder or both. In another embodiment, which is to be preferred because it is less subjected to wear, the hydraulic cylinder of the radiator is connected by means of rods and hinges to the two arms of the radiator, whilst the required variation in the opening of the radiator as a function of the elevation is the result of a suitable choice of the shape of the cam which drives the piston in the master cylinder of the hydraulic system. The shape of this cam can be determined in a similar way as the shape of the slots 775 in the embodiment first described.

The radiator described above is symmetrical, which means that when the opening increases it remains symmetrical with respect to the original axis of the radiator. This is not absolutely necessary. A radiator comprising only one swinging arm and in which the wall opposite to this arm is a fixed wall in the radiator housing can also be applied, provided that the apparatus need not fulfill the highest requirements. In this embodiment the displacement of the centre of the radiator opening with respect to the focal point of the reflector must be taken into account. Only in the case where the opening of the radiator is this embodiment has a certain predetermined value this centre can coincide with the focal point of the reflector or lens. In a practical embodiment of an aerial of this type the displacement of the centre of the radiator opening resulting from the displacement of the arm was not more than 4 cm. So small a displacement will have no serious influence on the beam concentration. The elevation of the radiated beam changes slightly as a result of the variation in the position of the centre of the radiator opening, but this is not a serious disadvantage because an aerial of the type described will never be used for the purpose of measuring elevation; the beam angle is far too large for an accurate measurement of the elevation angle. Preferably the radiator in an aerial of this type must be situated in such a way that the centre of the smallest opening nearly coincides with the focal point of the reflector or lens, for the smallest opening generates the narrowest beam, and if a narrow beam is required preferably the centre of the opening of the radiator must be situated on the axis of the reflector.

In FIGURE 4 the part 405 is the disc 205, 305, which drives the aerial around the elevation axis, whilst 406 of the shaft 206, 306. The groove in which the pin 222, 322 runs with its roller is designated by 440. It is assumed that the disc effects one complete rotation whilst the aerial reflector rotates eight times around its vertical axis. The figure shows a number of radii indicating points in the groove and such a point will be reached by the pin and roller 322 after the number of rotations around the vertical axis which corresponds to the number designating the radius on which the point is situated. In the point 0 the aerial possesses its smallest elevation. During 6½ rotations around the vertical axis the elevation is increased. Then the elevation is rapidly reduced to its value of rest whilst the aerial effects one and a half rotations around its vertical axis. During these one and a half rotations no useful information is received. Such a long interval without useful information would be disadvantageous, but in practice it has been possible to build aerials in which the reflector returns to its elevation of rest during an interval in which no more than one or even a half rotation around the vertical axis is performed. Rotational speeds of more than one revolution per second around the vertical axis caused no objection to this method of operation. The figure is clearer, however, when the groove is shown with such a shape that the return of the aerial to its elevation of rest is effected during a larger number of rotations around the vertical axis. The groove must have such a shape that the lower limit of the beam at the end of a complete rotation around the vertical axis of the aerial corresponds to the upper limit of the beam at the beginning of this rotation. This shape can be determined in various ways. In all cases, however, the basis for the above determination must be the required variation in the vertical beam angle as a function of the elevation. After this variation in the vertical beam angle as a function of the elevation has been determined, two curves can be drawn, one of which shows the variation in the lower limit and the other the variation in the upper limit as a function of the elevation angle. During the first revolution around the vertical axis the elevation generally remains constant. During the next revolution the elevation increases as a linear function of the azimuth, and in this revolution a number of azimuth positions are selected. For each of these positions the upper limit of the beam can be derived from one of the two curves mentioned above. Then by means of the other curve for each of these positions the elevation is established in which the lower limit of the beam corresponds to the upper limit determined previously. In this way for each of these points the elevation is determined which must be reached after the aerial has effected a complete revolution around the vertical axis. This operation is repeated again for each next revolution of the aerial until the maximum elevation has been reached. The variation in the elevation as a function of the rotation around the vertical axis has then been determined. For each of the said positions in azimuth the position of the pin in the groove is then known, and for each of these positions in azimuth the position of the disc is also known, so that the shape of the groove can be determined in the way described above.

Figure 10:
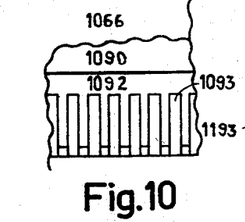
FIGURES 10, 11 and 12 show parts of an arm-shaped movable wall element provided with serrated chokes to be used in a horn radiator with a variable opening.
Figure 11:
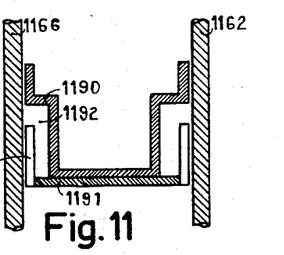
Figure 12:
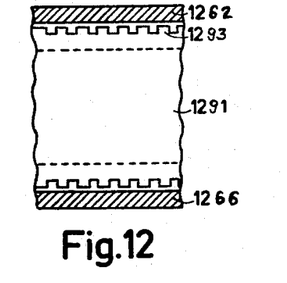

The FIGURES 10, 11 and 12 show the use of serrated chokes on the arms of a radiator with a variable opening. FIGURE 11 shows a part of a cross section of a radiator. The parts 1166 and 1162 are the fixed walls of the radiator. Furthermore, one of the two arms is shown. This arm consists of two parts 1190 and 1191, which are fabricated from plate metal by pressing, and are connected by means of screws, rivets or spotwelding. Opposite to each fixed wall a choke groove such as 1192 is present on the arm and this groove is provided with teeth such as 1193. In FIGURE 10, 1066 is the wall 1166 of FIGURE 11 but this wall is shown partly removed. Behind this wall a part 1090 of the arm, corresponding to the part 1190 of FIGURE 11 can be seen. Reference 1093 desigates on of these teeth, and 1092 the groove of the serrated choke. FIGURE 12 shows one of the arms seen from the under side. The parts 1266 and 1262 are the fixed walls of the radiator, while 1291 is the under side of the arm and 1293 one of the teeth constituting the wall of a choke groove.

I claim:

1. A helical scanning aerial system comprising a directional aerial, means for rotating said directional aerial about a first axis, means for reciprocating said directional aerial between first and second positions about a second axis normal to said first axis in synchronism with said rotating means, whereby said directional aerial rotates about said first axis a predetermined number of times for each cycle of motion about said second axis, and means for varying the beam angle of said directional aerial about an axis normal to said second axis in synchronism with said reciprocating means, whereby said beam angle increases as said directional aerial moves about said second axis from said first position to said second position and said beam angle decreases as said directional aerial moves about said second axis from said second position to said first position.

2. A helical scanning radar aerial system comprising a radiating system for transmitting a beam of electromagnetic energy, means for rotating said radiating system about a substantially vertical axis, and means coupled to said rotating means for cyclically varying the radiation direction of said beam between first and second positions about a horizontal axis and the beam angle of said beam in a direction transverse of said horizontal axis, whereby said radiating system rotates a predetermined number of times for each cyclic movement of said beam between said first and second positions and the beam angle of said beam increases as said beam direction varies from said first position to said second position and decreases as said beam direction varies from said second position to said first position.

3. A helical scanning radar aerial system comprising a radiating system for transmitting a beam of electromagnetic energy, means for continuously rotating said radiating system about a substantially vertical axis, means coupled to said rotating means for cyclically swinging said radiating system between first and second positions about a substantially horizontal axis whereby said radiating system rotates about said vertical axis a predetermined number of times for each swinging movement about said horizontal axis between said first and second positions, and means coupled to said cyclically swinging means for cyclically varying the beam angle of said beam of electromagnetic energy in a direction transverse to said horizontal axis, whereby said beam angle increases as said radiating system swings from said first to said second positions.

4. A helical scanning radar aerial system comprising a radiating system for transmitting a beam of electromagnetic energy, means for continuously rotating said radiating system about a substantially vertical axis, means coupled to said rotating means for cyclically swinging said radiating system between first and second positions about a substantially horizontal axis, whereby said radiating system rotates about said vertical axis a predetermined number of times for each swinging movement about said horizontal axis between said first and second positions and the rate of change of movement about said horizontal axis increases as said radiating system swings from said first to said second position, and means coupled to said cyclically swinging means for cyclically varying the beam angle of said beam of electromagnetic energy in a direction transverse to said horizontal axis, whereby said beam angle increases as said radiating system swings about said horizontal axis from said first position to said second position.

5. A helical scanning radar aerial system comprising a radiating system for transmitting a beam of electromagnetic energy, said radiating system comprising beam concentrating means and horn radiator means for directing said beam toward said beam concentating means, said aerial system further comprising means for continuously rotating said radiating system about a substantially vertical axis, means coupled to said rotating means for cyclically swinging said radiating system between first and second position about a substantially horizontal axis, whereby said radiating system rotates about said vertical axis a predetermined number of times for each cycle of swinging motion between said first and second positions about said horizontal axis, and means coupled to said cyclically swinging means for cyclically varying the flare angle of said horn radiator means in a direction transverse to said horizontal axis whereby said beam angle increases as said radiating system swings about said horizontal axis from said first position to said second position.

6. The aerial system of claim 5, in which said means for cyclically swinging said radiating system comprises means for increasing the rate of movement about said horizontal axis as said radiating system moves from said first position to said second position.

7. The aerial system of claim 5, wherein said horn radiator means is mounted in a fixed position with respect to said beam concentrating means, and said beam concentrating means comprises a parabolic reflector, whereby said parabolic reflector and horn radiator means rotate together about said vertical axis.

8. A helical scanning radar aerial system comprising a radiating system for transmitting a beam of electromagnetic energy, said radiating system comprising beam concentrating means and horn radiator means for directing said beam toward said beam concentrating means, said horn radiator means comprising means for moving at least one horn side for varying the flare angle of said horn radiator in the elevation direction, said aerial system further comprising means for continuously rotating said radiating system about a substantially vertical axis, and means coupled to said rotating means and said one horn side of said horn radiator means for cyclically varying the flare angle of said horn radiator means, whereby the beam angle of said horn in the elevation direction cyclically varies as said radiating system rotates about said vertical axis and said radiating system rotates about said vertical axis a predetermined number of times for each cycle of movement of said one horn side.

9. The aerial system of claim 8, in which said horn radiator means comprises a pair of fixed horn sides adjacent said one horn side, and said means for moving said one horn side comprises means for rotating said one horn side about a pivot adjacent the feeding point of said horn radiator means.

10. The aerial system of claim 9, in which the horn side of said horn radiator means opposite said one horn side is rotatable about a second pivot adjacent the feeding point of said horn radiator means, comprising means for moving said one horn side and said opposite horn side simultaneously about their respective pivots.

11. The aerial system of claim 9, wherein said one horn side comprises resilient metal tongue-shaped extensions which slide on said fixed horn sides when said one horn side is rotated about said pivot.

No references cited.

HERMAN KARL SAALBACH, *Primary Examiner.*

L. ALLAHUT, *Assistant Examiner.*